(12) United States Patent
Goodin

(10) Patent No.: US 11,371,258 B2
(45) Date of Patent: Jun. 28, 2022

(54) APPARATUS AND METHODS FOR PROVIDING A PORTABLE FENCE

(71) Applicant: SportaFlex, LLC, Mesa, AZ (US)

(72) Inventor: Terry Lynn Goodin, Mesa, AZ (US)

(73) Assignee: Sportaflex, LLC, Mesa, AZ (US)

( * ) Notice: Subject to any disclaimer, the term of this patent is extended or adjusted under 35 U.S.C. 154(b) by 696 days.

(21) Appl. No.: 16/320,061

(22) PCT Filed: Aug. 1, 2017

(86) PCT No.: PCT/US2017/044979
§ 371 (c)(1),
(2) Date: Jan. 23, 2019

(87) PCT Pub. No.: WO2018/026862
PCT Pub. Date: Feb. 8, 2018

(65) Prior Publication Data
US 2019/0226232 A1      Jul. 25, 2019

Related U.S. Application Data

(60) Provisional application No. 62/371,465, filed on Aug. 5, 2016.

(51) Int. Cl.
*E04H 17/22* (2006.01)
*E02D 5/80* (2006.01)
*E04H 17/18* (2006.01)

(52) U.S. Cl.
CPC .............. *E04H 17/22* (2013.01); *E04H 17/18* (2013.01)

(58) Field of Classification Search
CPC ....... E04H 17/009; E04H 17/08; E04H 17/18; E04H 17/22; E01F 13/024; E01F 13/026;
(Continued)

(56) References Cited

U.S. PATENT DOCUMENTS 702,154 A * 6/1902 Quiggin et al. ..... A63B 67/045
                                                                473/491
2,996,295 A * 8/1961 Smith ...................... A63B 5/10
                                                                267/178
(Continued)

FOREIGN PATENT DOCUMENTS

CN       108506392 A  *  9/2018  .............. F16F 1/122
DE       19801925 A1  *  8/1998  .............. F16F 1/122
(Continued)

OTHER PUBLICATIONS

ASTM, ASTM A500/A500M, May 22, 2012, NPL of ASTM Standards for A500 Steel (Year: 2012).*
(Continued)

*Primary Examiner* — Josh Skroupa
*Assistant Examiner* — Zachary A Hall
(74) *Attorney, Agent, or Firm* — Rodman & Rodman LLP

(57) ABSTRACT

The invention pertains to a portable fencing system that provides for easy and versatile positioning and removal. In one aspect, the portable fencing system includes sleeves that are pre-positioned in the ground so as to define a predetermined boundary suitable for a particular repetitive use. In another aspect, a portable fencing system that is without pre-positioned sleeves is described, which is more suitable for applications where the insertion of semi-permanent sleeves is impracticable, or where added positioning flexibility is desired.

21 Claims, 8 Drawing Sheets

(58) Field of Classification Search
CPC .. E01F 13/028; F16F 1/12; F16F 1/122; F16F 1/123
USPC .................. 256/24; 248/548, 597, 600, 601
See application file for complete search history.

(56) References Cited

U.S. PATENT DOCUMENTS

| | | | | |
|---|---|---|---|---|
| 3,563,526 | A * | 2/1971 | Mui | F16F 1/122 267/178 |
| 3,822,850 | A * | 7/1974 | Elias | E04H 17/18 248/551 |
| 4,498,657 | A * | 2/1985 | Werner | E01F 9/669 248/469 |
| 4,712,778 | A * | 12/1987 | Newman | F16F 1/125 267/170 |
| 4,792,088 | A * | 12/1988 | Bonnell | A47G 29/1216 232/17 |
| 4,793,597 | A * | 12/1988 | Smith | B60G 11/52 248/634 |
| 5,180,143 | A | 1/1993 | Brower | |
| 5,442,871 | A * | 8/1995 | Sarkisian | G09F 7/22 40/606.17 |
| H1588 | H * | 9/1996 | Arney | E04H 17/18 343/715 |
| 5,875,578 | A * | 3/1999 | Grewe | E01F 9/662 40/608 |
| 6,371,465 | B1 * | 4/2002 | Willis | F16F 1/06 267/166 |
| 6,592,387 | B2 | 7/2003 | Komenda et al. | |
| 6,604,719 | B1 * | 8/2003 | Dicke | G09F 15/0056 248/160 |
| 6,851,661 | B1 * | 2/2005 | Penning | E04H 17/18 256/19 |
| 6,953,180 | B1 | 10/2005 | Ruvalcaba et al. | |
| 6,959,902 | B2 * | 11/2005 | Leahy | E01F 9/631 248/530 |
| 7,032,811 | B1 | 4/2006 | Paulic et al. | |
| 7,443,361 | B2 * | 10/2008 | Haynes | H01Q 1/085 343/878 |
| 7,794,123 | B2 * | 9/2010 | Newbill | A47G 29/1216 40/608 |
| 7,832,695 | B2 * | 11/2010 | Ebel | E01F 9/629 248/156 |
| 8,104,205 | B2 * | 1/2012 | Hillstrom | G09F 15/0056 40/607.01 |
| 9,719,272 | B1 * | 8/2017 | Torsiello, Jr. | E01F 9/60 |
| 2005/0173690 | A1 * | 8/2005 | Penning | E01F 13/022 256/65.14 |
| 2006/0022189 | A1 | 2/2006 | Collins, IV | |
| 2009/0283734 | A1 | 11/2009 | Penning | |
| 2010/0187490 | A1 * | 7/2010 | Hatton | E04H 17/08 256/19 |
| 2019/0128007 | A1 * | 5/2019 | Torsiello | E01F 9/629 |
| 2021/0071438 | A1 * | 3/2021 | Torsiello | E01F 9/629 |

FOREIGN PATENT DOCUMENTS

| | | | | |
|---|---|---|---|---|
| FR | 2668196 | A1 * | 4/1992 | ............ E01F 9/685 |
| GB | 906123 | A * | 9/1962 | ............ F16F 1/122 |
| GB | 2527857 | A * | 1/2016 | ............ E04H 17/163 |
| KR | 930002714 | Y1 * | 5/1993 | ........... E04H 17/163 |
| KR | 101030996 | B1 * | 4/2011 | |
| KR | 20140038510 | A * | 3/2014 | ............ E01F 13/022 |
| KR | 101742245 | B1 * | 6/2017 | |

OTHER PUBLICATIONS

International Search Report for PCT/US2017/044979 dated Oct. 6, 2017.

* cited by examiner

APPARATUS AND METHODS FOR PROVIDING A PORTABLE FENCE

CROSS REFERENCE TO RELATED APPLICATIONS

This application is a 35 U.S.C. Section 371 National Stage Entry of International Patent Application No. PCT/US2017/044979, filed Aug. 1, 2017, and entitled "APPARATUS AND METHODS FOR PROVIDING A PORTABLE FENCE", which claims the benefit of U.S. Provisional Application No. 62/371,465, filed Aug. 5, 2016, and entitled APPARATUS, SYSTEMS AND METHODS FOR PROVIDING A PORTABLE FENCE, naming Terry Lynn Goodin as inventor. The entire content of the foregoing patent applications is incorporated herein by reference, including all text, tables and drawings.

TECHNICAL FIELD

Apparatus, systems, and methods for a temporary and portable fence suitable for sports and recreational events.

BACKGROUND OF THE INVENTION

Temporary portable fencing for multi-use properties has long been a challenge for owners of public spaces, such as at schools, parks, and similar facilities. This challenge arises for a variety of reasons, including the conflicting requirements of strength and durability versus convenience and ease-of-use. More recently, limited space and budgetary considerations are driving a trend toward multiuse facilities, with the attendant need for flexibility in the placement of the fences. While various temporary or portable fencing systems have been proposed to meet these requirements, there still presently exists a need for a temporary portable fencing system that is at the same time strong and durable while also being easy to erect and disassemble, and highly adaptable as to the placement of the fence. Furthermore, user safety is also an important consideration, especially when the fencing is used in conjunction with sporting events such as baseball, football, and soccer. The invention described herein overcomes many of the deficiencies in prior art temporary portable fencing as will be explained in detail below.

SUMMARY OF THE INVENTION

The portable fence system described herein comprises flexible barrier netting supported at regular intervals between upright rigid mounting poles. In some embodiments, the system uses common, readily available, and inexpensive components such as tubing and flexible netting. In some embodiments the flexible netting is constructed of a synthetic polymer such as polyethylene, polyester, or Nylon®. Netting suitable for use in the instant application is readily available commercially as, for example, knitted polyethylene barrier netting known by various names such as "Roll-A-Fence." Poles for mounting the barrier netting can be tubing or solid rods having sufficient rigidity to fully support the barrier fencing in an upright position over an expected range of conditions. In some embodiments, the rigid mounting poles can be made from, for example, an aluminum alloy. In yet other embodiments, the barrier netting mounting poles can comprise a synthetic polymer material such as polyvinyl chloride (PVC), Nylon®, or other suitable synthetic polymeric composition. Tubing, either hollow or solid, suitable for the present application is also readily available from commercial suppliers, thereby maximizing convenience and minimizing expense.

In some embodiments, the barrier netting mounting poles are maintained erect on dirt or grass covered areas by attaching them to a specially configured anchor fixture mounted into the ground. In an alternative embodiment, the barrier netting support poles can be maintained erect on dirt or grass covered areas, or on hard surfaces or floors, by anchoring to an anchor fixture having large flat plates that lie entirely above the surface of the area to be enclosed. In order to reduce the chance of damage to the poles and injury to players, the pole anchoring systems described herein may include springs that reversibly flex under impact, or adapters that break upon moderate impact.

The anchoring system according to a first embodiment of the invention comprises an anchor sleeve (102) that is placed into the earth so as to provide a semi-permanent means for receiving and supporting an anchor fixture (202). Anchor sleeve (102) is configured to allow anchor fixture (202) to be removably connected thereto. Anchor fixture assembly (200) comprises anchor fixture (202), further comprising sleeve mount cylinder (106) that, when inserted into anchor sleeve (102), provides sufficient lateral support for maintaining the temporary fence upright. Anchor fixture assembly (200) may further comprise one or more spring mount bolts (204) and spring mount nuts (206), which serve to mount springs (110) to plate (108). Spring (110) in turn is configured to removably attach to and support a flexible netting mounting pole (104) and maintain it in a substantially upright position. In some preferred embodiments, anchor fixture assembly (200) is configured to receive two or more mounting poles.

Anchor fixture assembly (200) may also comprise one or more pole adapters (112) configured for removably connecting mounting poles (104) to springs (110). Anchor fixture (202) may be constructed of a variety of materials, including various plastics or metal alloys having suitable mechanical and environmental durability characteristics as are well known to those of skill in the art. In some embodiments, anchor fixture (202) is constructed using a steel, iron, or aluminum alloy for its components and by welding or soldering the components together. In other embodiments, anchor fixture (202) is made using a cast polymer material such as PVC, polyester, polyethylene, or similar such materials as are currently known, or may become known in the art.

In another embodiment, more suitable to circumstances where it is not desirable or practicable to place semi-permanent anchor sleeves (102) below the playing surface, a portable fencing system (400) is configured with a sufficiently large anchor plate (408) that the temporary fence can be maintained upright under normal circumstances without the aid of anchor sleeve (102) or other such support element placed beneath the playing field surface. In some embodiments, the entire anchor fixture assembly (500) resides above the ground, floor, or other surface upon which the temporary fence is erected. In some cases, anchor plate (408) of the second embodiment may be secured to a floor or hard surface by supplemental means such as screws, bolts, dzus fasteners, etc.

Exemplary embodiments of the apparatus, system, and method sufficient to allow one of ordinary skill to practice the invention are set forth in the drawings and description set forth below.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. In the interests of clarity, technical material that is known in the technical fields related to the invention has not been described in detail so that the invention is not unnecessarily obscured. As the present invention is intended in some embodiments for indoor use, or where it is desirable or necessary for the mounting system to reside entirely above the surface, the term "ground" as used herein should be understood to include all embodiments of the portable fencing system, whether deployed outdoors or indoors, or on grass, dirt, or on floors or on hard or soft surfaces.

Figure 1:
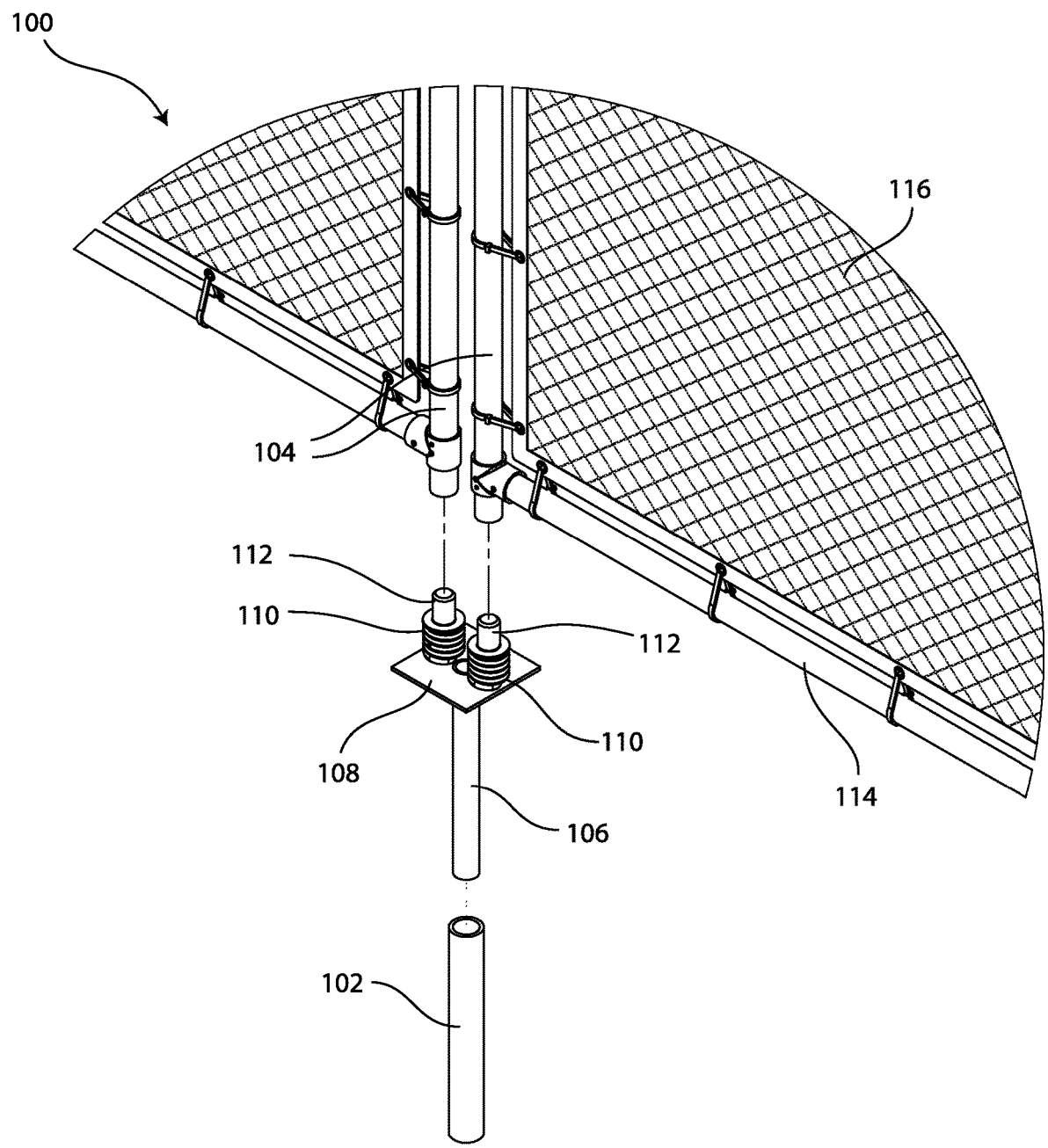
FIG. 1 shows a perspective view of a portable fencing system that includes an anchor sleeve to receive a mounting pole.
Figure 2:
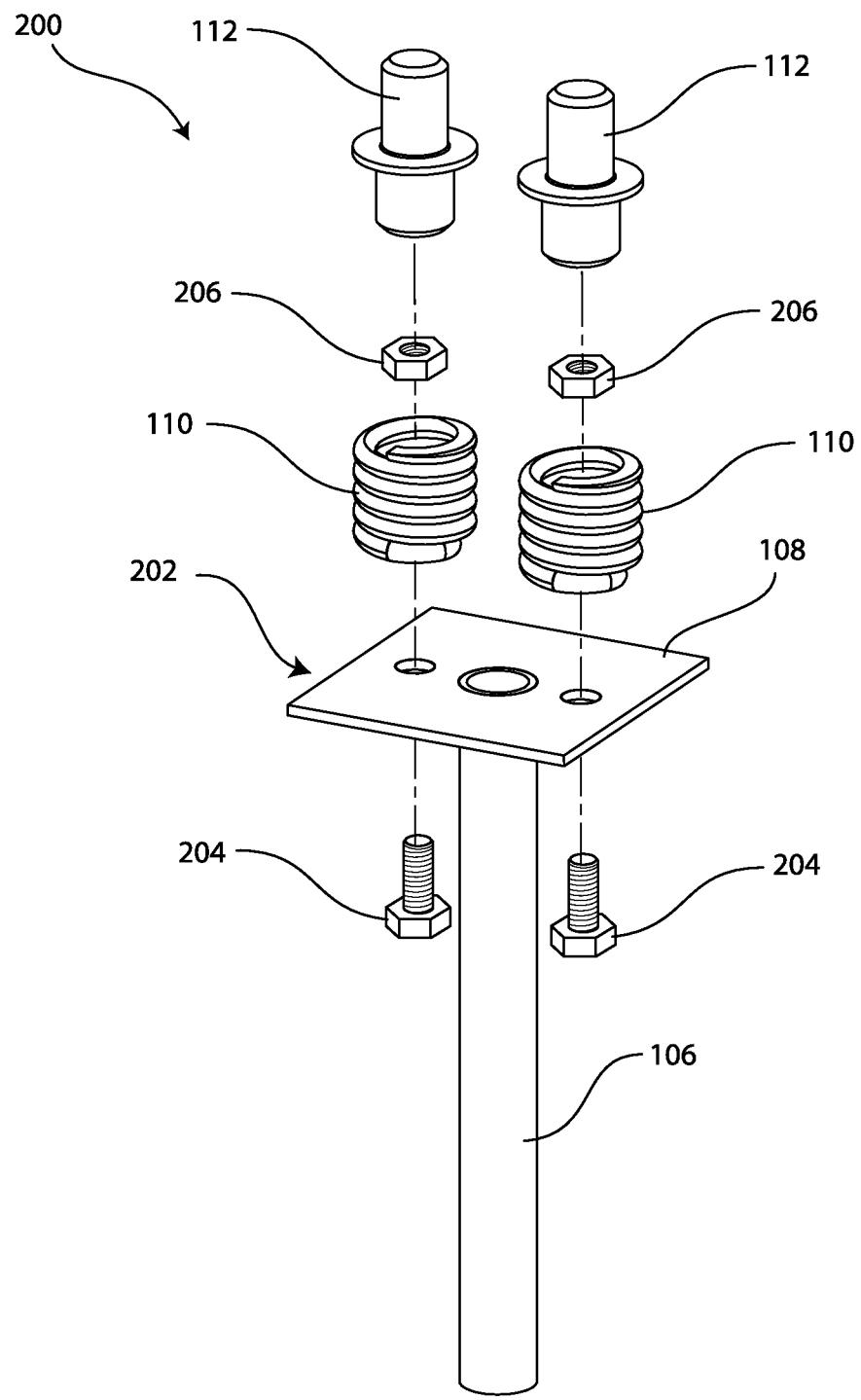
FIG. 2 shows an exploded perspective view of a portable fence anchor fixture assembly.
Figure 3:
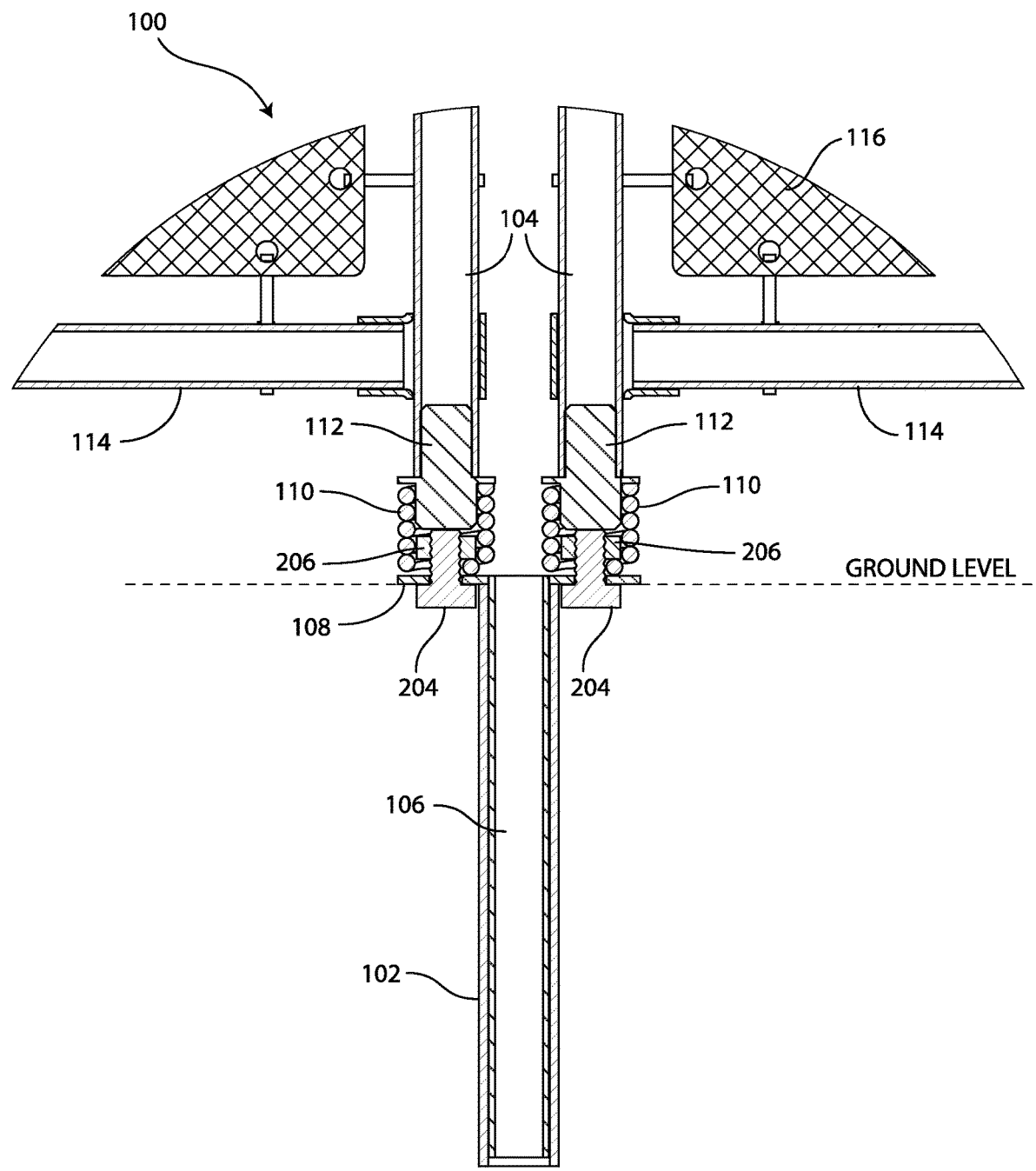
FIG. 3 shows a cross-sectional view of a portable fence mounting system as it might appear when mounted into the ground.
Figure 4:
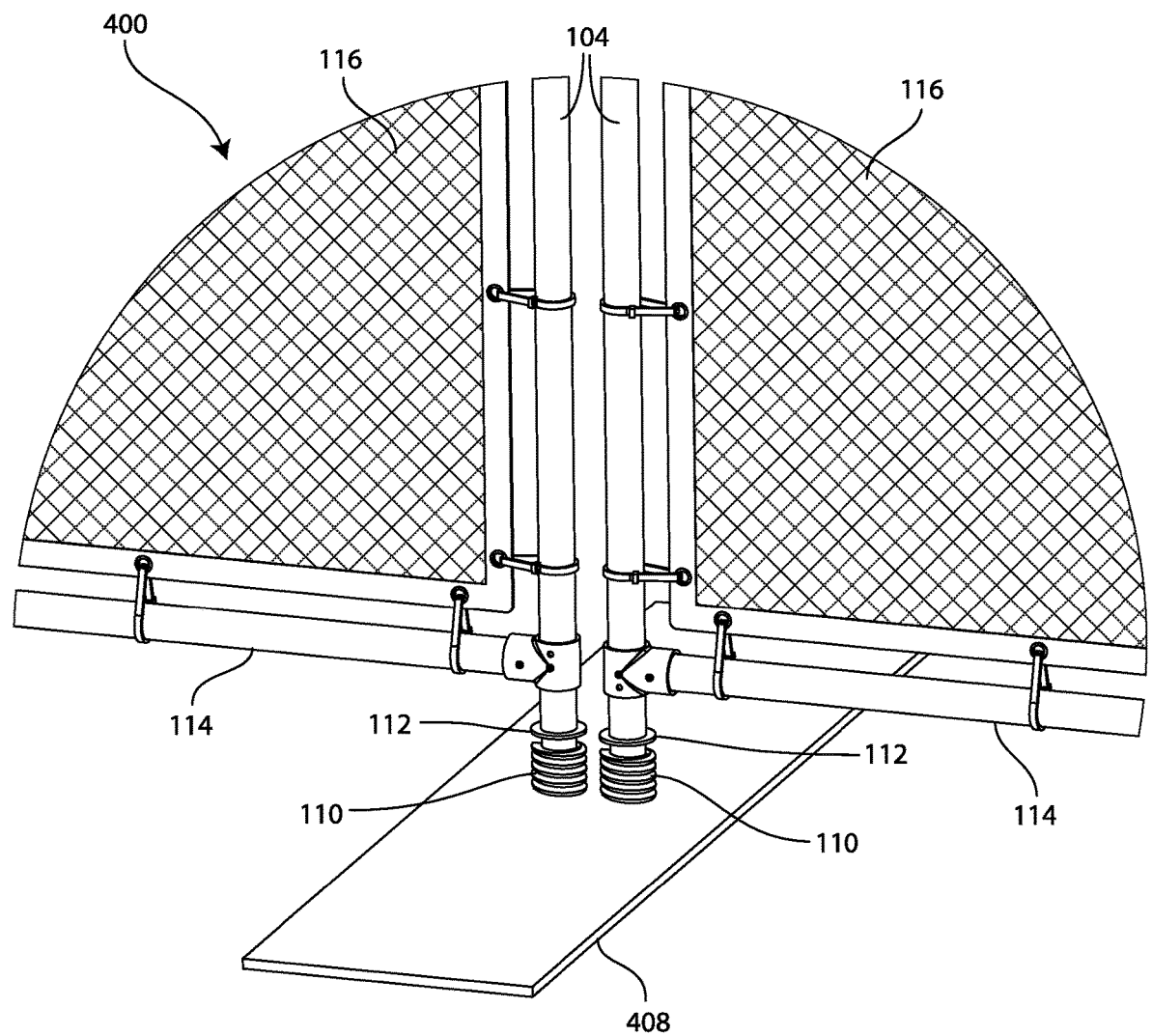
FIG. 4 shows a perspective view of a portable fencing system where the anchor fixture assembly resides upon the environmental playing surface.

In order to provide user safety in the event of, for example, a sports participant colliding with perimeter fencing, embodiments of a portable fence system, as depicted generally in FIG. 1 and FIG. 4, are provided that allow barrier netting mounting poles to tilt or collapse upon impact. Referring now to FIGS. 1-3, there is presented a portable fencing system (100) according broadly to a first exemplary embodiment wherein the fence is supported in an upright position with the aid of an element placed into the ground. In some preferred embodiments, mounting pole (104) is allowed to tilt upon impact with the pole or its associated barrier netting (116) by interposing a spring (110) between the bottom of pole (104) and anchor fixture (202). In some alternative embodiments, fencing system (100) may not include spring (110) or adapter (112), or may include other elements as will be presented below.

Portable fencing system (100) according to this first exemplary embodiment of the invention comprises an anchor sleeve (102) that is placed into the ground to provide a semi-permanent means for receiving and supporting anchor fixture (202). Anchor sleeve (102) is configured to allow anchor fixture assembly (200) to be removably attached thereto. Anchor fixture (202) comprises sleeve mounting cylinder (106) that, when inserted into anchor sleeve (102), provides sufficient lateral support for maintaining mounting poles (104) and associated barrier netting (116) in a substantially upright position. Anchor fixture (202) further comprises, in this exemplary embodiment, two springs (110) that are affixed to plate (108) by bolts (204) and nuts (206). In order to facilitate secure attachment, the lower coils of springs (110) are wound with smaller inside diameters so as to provide a suitable purchase for nuts (206), while the upper inside diameters are large enough to allow clearance for the nuts (206), thereby providing temporary but secure attachment to mounting pole (104), either directly or by interposing pole adapter (112).

Referring now to FIG. 1, flexible barrier netting (116) is attached to a barrier frame comprising netting frame poles (114) that are dimensioned in width according to the placement of anchor sleeves (102), and in height according to its intended use. The barrier frame width is dimensioned so as to allow for easy portability by one or two people, and in height according to the activity to which it is applied. In some applications, the barrier frame has a width of at least six feet and in other applications, a width of at least nine feet. In some applications, the barrier frame has a height of at least three feet and, in other applications, a height of at least six feet. In a modification of the first embodiment, the barrier frame can be omitted and barrier netting (116) simply attached at each end to two vertically upright adjacent mounting poles (104). Considerations as to the material and dimensions of mounting poles (104) and netting frame poles (114) include strength, weight, and cost. It has been found that mounting poles constructed of extruded 6061 or 6063 aluminum alloy pipe or tubing having outside diameters in the range 1.0 inch to 1.5 inch, are suitable for this application. Mounting poles with wall thicknesses in the range 0.05 inch to 0.125 inch have been found to be satisfactory for the typical range of portable fence height and width dimensions as described herein. In some embodiments, mounting pole (104) has an outside diameter of 1.25 inch with a wall thickness of 0.06 inch. In other embodiments, mounting pole (104) has an outside diameter greater than about 1 inch and a wall thickness greater than about 0.05 inch.

Anchor sleeves (102) are preferably positioned in the ground according to a desired perimeter to be defined by the portable fence, and are spaced according to the widths of the sections of flexible barrier netting they are intended to support. Being relatively unobtrusive, anchor sleeves (102) can remain embedded in the ground essentially indefinitely, thereby allowing for easy removal and subsequent quick redeployment of anchor fixture assembly (200) and other elements of the present portable fencing system. Anchor sleeves (102) can be constructed using various commercially available pipe or tubing including aluminum or galvanized iron pipe. It has been found that PVC pipe is also well suited for this application. More specifically, nominal 1.250 inch schedule 40 PVC pipe has been found very suitable, but sizes somewhat smaller or larger in diameter can also be used. Anchor sleeve (102) can be in the range of 12-24 inches and more favorably in a range of 15-21 inches in length. Anchor sleeve (102) can be pounded into the ground, or holes in the ground suitable for inserting anchor sleeve (102) can be made by various appropriate and well known methods such as using a power drill and auger bit. A cap or plug can be inserted on the upper end of anchor sleeve (102) to prevent it from filling with debris and to facilitate finding it more easily.

Referring now to FIG. 2, there is shown in exploded perspective view anchor fixture assembly (200) according the first embodiment as in FIG. 1 comprising an anchor fixture (202), having a sleeve mounting cylinder (106), which provides the appropriate lateral rigidity required to support one or more fence mounting poles (104) in an upright position during normal use. Anchor fixture assembly (200) may further comprise one or more mounting springs (110) and associated mounting pole adapters (112), which are configured to support one or more mounting poles (104). Mounting spring (110) may be configured such that at the bottom end the spring is partially closed so as to allow the spring to be bolted directly to plate (108) using bolt (204) and nut (206). An optional pole adapter (112) can be configured so as to provide mechanical attachment of mounting pole (104) to spring (110). As such, pole adapter (112) can fit snuggly into mounting pole (104) at its upper end, and fit snuggly into spring (110) at its lower end. A raised portion between the top and bottom ends of pole adapter (112), as is indicated in FIG. 2, helps correctly locate pole adapter (112) at the desired depths into mounting pole (104) and spring (110), respectively.

Pole adapter (112) can be configured to couple mounting pole (104) to spring (110). In this embodiment, pole adapter (112) may be configured with a first length and first diameter pertaining to the upper end portion for secure, but removable, insertion into mounting pole (104), and with a second length and second diameter pertaining to a lower end portion for secure, but removable, insertion inside spring (110). The length of said upper end portion, which is adapted for insertion inside mounting pole (104), can be in the range 2-5 inches with 3.5 inches being a satisfactory length in many cases. The length of said lower end portion of adapter (112), which is adapted for insertion inside spring (110) can be in the range 0.75-1.5 inches with about 1.0 inch being a length that has been found to be suitable for many applications. Said raised portion may be in the form of a raised collar that extends circumferentially around pole adapter (112), or may be in the form of discrete raised portions. The length of said raised portion should be the minimum necessary so as to not unnecessarily raise the bottom of the fence panels above the playing surface. It has been found that a length of 0.125 inch is sufficient in most cases. The outside diameter of the raised portion can extend to any convenient dimension, but generally equal to or somewhat less that the larger of the outside diameters of mounting pole (104) or spring (112) is appropriate. A diameter of 1.6 inches has been found satisfactory, but larger or smaller diameters in the range 1.4-1.8 inches can be used in most cases.

Pole adapter (112) can be formed of a variety of materials including various aluminum alloys, various polymeric materials such as Nylon®, Delrin®, or glass-filled composites thereof. Other suitable materials that are known, or may become known, to those of skill in the material and mechanical arts are also included within the scope and spirit of the invention. Pole adapter (112) may be in the form of a solid cylinder or in the form of a tube having a wall thickness appropriate to withstand the expected lateral forces without deforming or breaking. It has been found that a hollow bore adapter with a wall thickness of 0.175 inch is suitable for the range of fencing system dimensions considered herein, but thicknesses in the range of 0.125 to 0.35 may be suitable for some applications. In some embodiments, pole adapter (112) is configured to break when a lateral force somewhat less than sufficient to cause permanent damage to mounting pole (104) is applied. In other embodiments, pole adapter (112) is adapted to break when a lateral force somewhat less than sufficient to result in injury to a player is applied. In these alternative embodiments, pole adapter (112) may be in the form of a tube with a wall thickness such that it fails at a lateral load level less than that at which mounting pole (104) would fail, or at a lateral load level less than that at which injury to a player might occur. Pole adapters (112) can be further configured so as to release from their respective connections when an excessive lateral force is applied, thereby reducing the likelihood of damage to mounting pole (104) or spring (110). Exemplary pole adapters (112) of FIG. 2 are but one of many configurations that would occur to one of skill in the art and which would still fall within the spirit and scope of the invention.

Anchor fixture (202) is advantageously constructed of a suitable metal or metal alloy material that is rendered resistant to the environmental effects of prolonged placement in the ground. For example, anchor fixture (202) can be constructed by welding or soldering a metal sleeve mount cylinder (106) to a metal plate (108). The metal used for plate (108) and sleeve mount cylinder (106) may be, for example, steel, iron, or alloys thereof. Sleeve mount cylinder (106) should advantageously have an outside diameter that allows easy insertion into anchor sleeve (102), and have a wall thickness that provides adequate strength to resist bending under lateral load. It has been found that nominal 1.0 inch schedule 40 steel pipe, having an outside diameter of approximately 1.375 inch, and an inside diameter of approximately 1.049 inch, is suitable for anchor sleeve (102) in this application. The length of sleeve mount cylinder (106) can be equal to or somewhat less than the length of anchor sleeve (102), so as to allow plate (108) to rest solidly on the playing surface. If, for example, anchor sleeve (102) is 15 inches in length, then sleeve mount cylinder (106) can be in the approximate range 11-14.5 inches in length. It has been found that plate (108) can be a steel plate having dimensions of approximately 9 inches in length, 5 inches in width, and with a thickness 0.1875 inch, which provides adequate stability for a portable fence having a height in the range of 6 feet to 8 feet. In order to resist corrosion, a metal anchor fixture (202) can be painted, powder coated, plated, chemically treated, or otherwise coated according to well-known methods and materials. Anchor fixture (202) can also be constructed by other methods and using other materials, such as for example by forming or casting it of a composite or polymeric material.

Referring still to FIG. 2, springs (110) are advantageously constructed of heavy gauge steel having sufficient bending stiffness to provide suitable lateral support to their respective mounting poles (104). The lateral stiffness of mounting springs (110) should be such that they maintain the fence poles upright under the expected range of circumstances, but not so stiff as to cause its supported fence pole (104) to bend irreversibly beyond its elastic limit if impacted by, for example, a sports participant. In one variation of the first embodiment, adapter (112) can be eliminated and the inside diameter of spring (110) made compatible with the outside diameter of mounting pole (104) so as to allow a snug, but removable, fit of mounting pole (104) directly into spring (110). In this variation of the first embodiment, the extension of mounting pole (104) below the "T" connector, or some other suitable obstruction, can be used to limit the depth of insertion of mounting pole (104) into spring (110), thereby providing both secure connection to, and adequate flexibility for, spring (110). In some embodiments the anchor fixture assembly (200) achieves a low profile for netting frame pole (114) and attached netting (116) above the playing surface such that the gap between the bottom of the netting frame pole (114) and ground level of the earth or floor surface is minimized.

Spring (110) may be used without modification in one or more of the various exemplary embodiments of the invention as described herein. Spring (110) can be constructed from roundbar having a range of diameters and materials. In certain embodiments, spring (110) can be constructed of 0.343 inch solid steel roundbar, such as ASTM material grade A500 or A501 wound with a 2.0 inch outside diameter and having an inside diameter of 1.3 inch, which inside diameter is selected to provide an interference fit with adapter (112). Alternatively, adapter (112) can be configured to provide an interference fit with spring (110). An interference fit is defined as being approximately in accordance to the ANSI B4.1 standard for a FN-1 light drive fits. Spring (110) can be constructed without gaps between turns, and the number of turns can be such as to give a length of spring (110) in the range 2.5-3.5 inches. These dimensions have been found to be suitable for a fence having mounting poles (104) in the range 4.5-8.0 feet in height. Suitable dimensions can be easily configured for shorter or taller fences, or for applications requiring increased or decreased lateral stiffness as is readily discernable to those of skill in the art in view of the exemplary embodiments presented herein.

Referring now to FIG. 3, there is shown in cross-sectional view a fully assembled portable fence mounting system (100) according to the first exemplary embodiment as presented in FIG. 1 and FIG. 2. When erecting fence mounting system (100) for the first time on a suitable playing field, anchor sleeves (102) are inserted into the ground at suitable intervals, determined by the length of netting frame poles (114), along the desired perimeter of the portable fencing system (100). At some time prior to erecting portable fencing system (100) for the first time, a suitable number of barrier netting panels are assembled or procured pre-assembled from a third party, each panel comprising flexible barrier netting (116) supported by two vertically oriented mounting poles (104), two horizontally oriented netting frame poles (114), and their four respective connectors. The number of panels required depends on the length of barrier fencing needed. After assembling a panel frame, flexible barrier netting (116) is affixed by suitable means such as, for example, cable ties to fence mounting poles (104) and, if included, one pole adapter (112) is attached to each mounting pole (104). A spring (110) corresponding to each mounting pole (104) is affixed to each anchor fixture (202), either by bolting or by otherwise permanently or semi-permanently attaching them to plate (108). When it is desired to erect the portable fencing system (100), each assembled anchor fixture (202), comprising springs (110), plate (108), and sleeve mounting cylinders (106), is inserted into its respective anchor sleeves (102) such that each anchor fixture plate (108) rests flat on the playing surface.

The configuration of portable fencing system (100) permits it to be quickly and easily dismantle by simply first lifting the fencing panels off of their respective anchor fixtures (202), and then removing the anchor fixtures (202) from their respective anchor sleeves (102). When disassembled, the only portion of the portable fence system of the present invention that remains in place are anchor sleeves (102), which presents only an inconsequential visual, physical, and environmental impact. When it is desired at a later time to reassemble the portable fence, having the anchor sleeves left in the ground allows the portable fence of the present invention to be easily and quickly erected again by simply reversing the above disassembly procedure. By arranging various configurations for the placement of anchor elements in a given recreation or work area, the portable fencing system of the present invention can serve a variety of uses. For example, the present portable fencing system makes it feasible to accommodate various sporting events in a short period of time. Thus, for example, a baseball game can be scheduled in the morning and, after relocating the portable fence, a soccer game in the afternoon.

Referring now to FIG. 4, there is presented a perspective view of an anchor fixture assembly (400) according to a second exemplary embodiment of a portable fencing system that is broadly similar to that described in the first embodiments, but configured for use on indoor surfaces, hard outdoor surfaces, or where, for any reason, placing the anchor fixture completely above the playing surface is preferred. In this alternative embodiment, the area of the anchor plate (408) may be increased relative to the first embodiment so as to provide, without the presence of an anchor sleeve (102) or sleeve cylinder (106), sufficient lateral support for the fence poles.

In this alternate embodiment, portable fence anchor system (400) comprises an anchor plate (408) to which is affixed, similarly to anchor plate (108) of the first embodiment, one or more springs (110). Any of the previously described mounting methods, such as bolting then to plate (408) as used in the first embodiment can be utilized. Plate (408) can be enlarged relative to plate (108) of the first embodiment. It has been found that a steel plate having dimensions of 33 inches in length, with a width of 10 inches and a thickness of 0.375 inch provides adequate stability for a portable fence having a height in the range 6-8 feet. Other dimensions can be used, as would occur to one of skill in the related arts. For example, lengths in the range 25-40 inches, widths in the range 6-14 inches, and thicknesses in the range 0.25-0.5 inches may be suitable for some applications.

Figure 5:
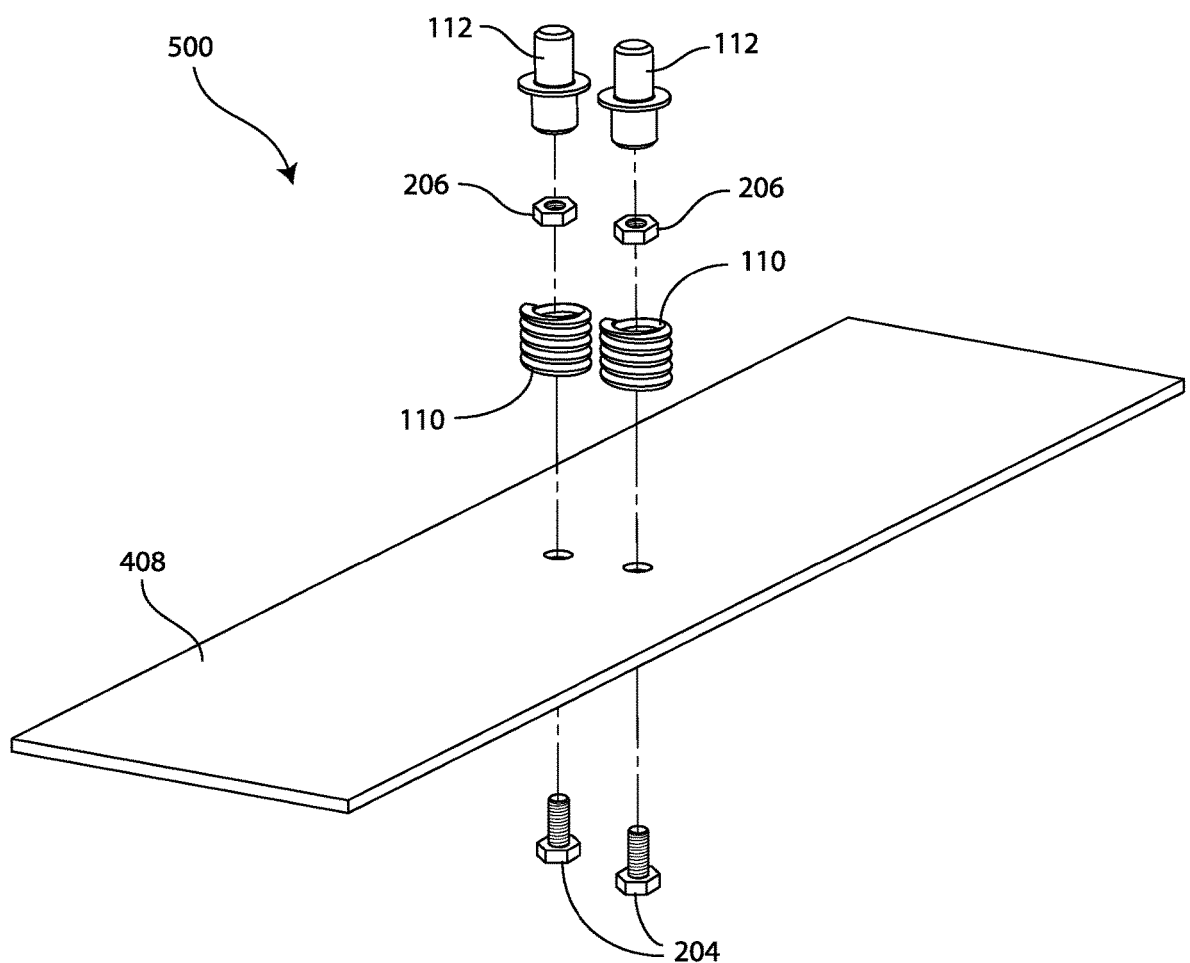
FIG. 5 shows an exploded perspective view of an anchor fixture assembly as in FIG. 4 resting on an environmental surface.
Figure 6:
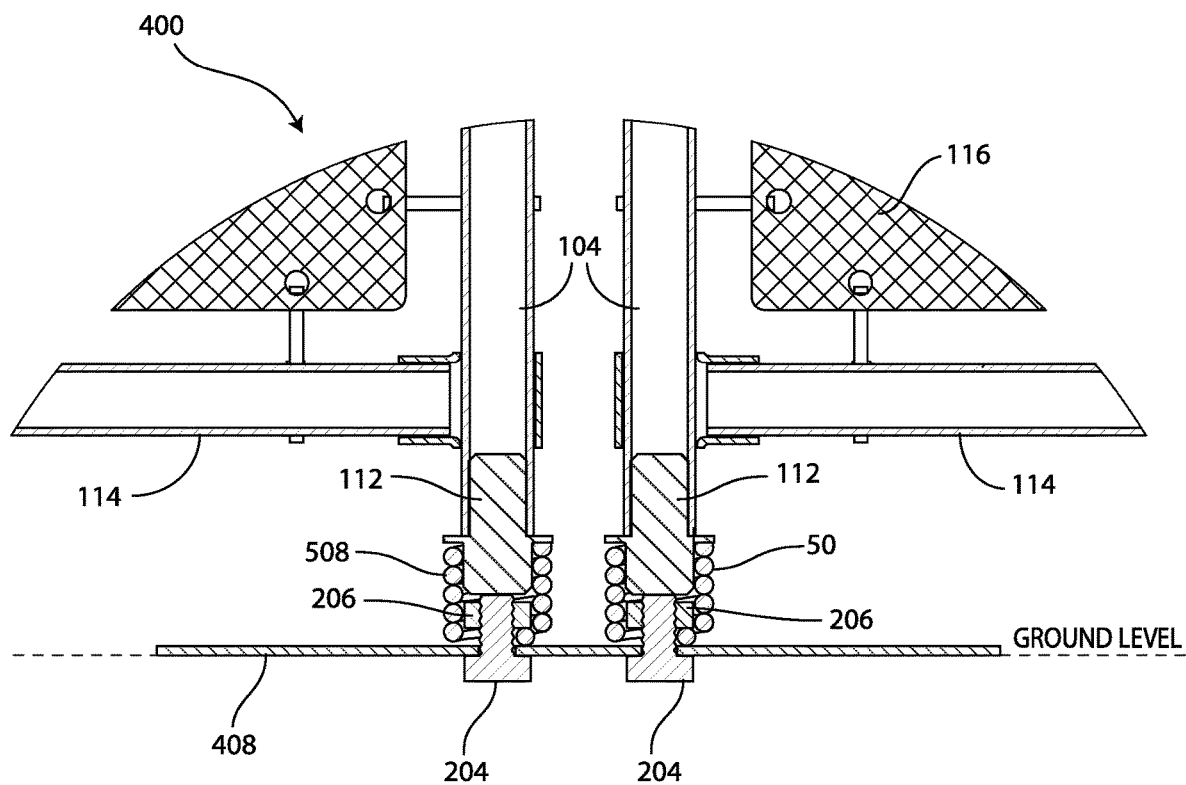
FIG. 6 shows a cross-sectional view of the portable fencing system as in FIG. 4.

Referring now to FIG. 5, there is presented an exploded perspective view of anchor fixture assembly (500), corresponding generally to FIG. 2 of the first embodiment, according to the second exemplary embodiment of the invention. Other than the absence of anchor sleeve (102) and sleeve mount cylinder (106), description and features described above relative to anchor fixture assembly (200) of the first embodiment apply equally to anchor fixture assembly (500). FIG. 6, which corresponds to FIG. 3 of the first embodiment, presents in cross-sectional view a fully assembled portable fence mounting system (400) according to the second exemplary embodiment as presented in FIG. 4 and FIG. 5.

Figure 7:
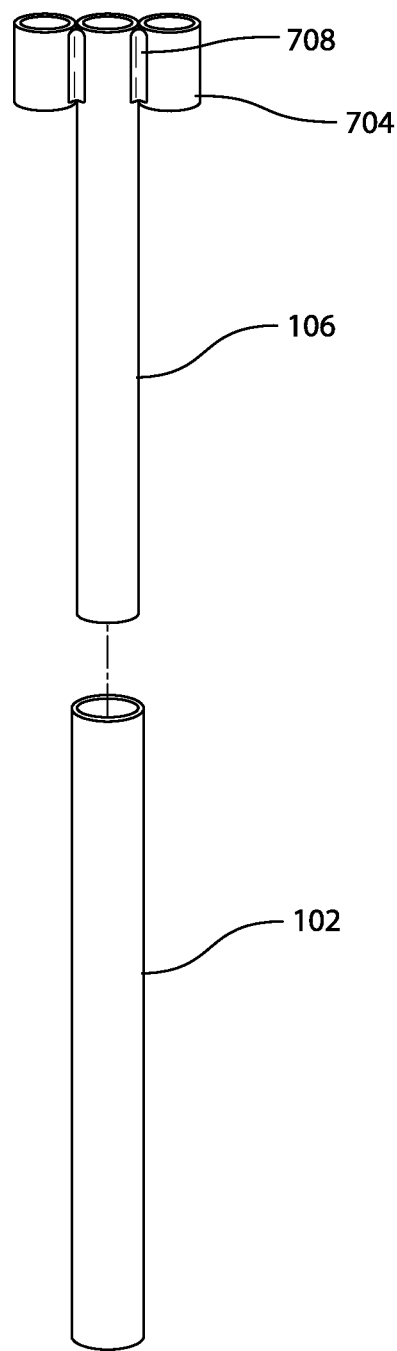
FIG. 7 shows an exploded perspective view of an anchor sleeve and mounting pole; and, FIG. 8 shows an exploded perspective view of an anchor plate with an anchor screw.

Referring now to FIG. 7, there is presented an exploded perspective view an anchor fixture assembly according to a highly simplified alternative of the first embodiment in which mounting poles (104) are inserted directly into mounting pole cups (704) that are fastened to sleeve mount cylinder (106). As in the previously described embodiments, sleeve mount cylinder (106) is inserted into anchor sleeve (102). Mounting cups (704) can be attached to sleeve mount cylinder (106) by various methods, including welding, soldering, riveting, or any of the methods that would be obvious to one having an ordinary level of skill in the art. In other regards, the fence system of this alternative embodiment is compatible with the previously described embodiments, including the size and construction of the fence panels, mounting poles.

Figure 8:
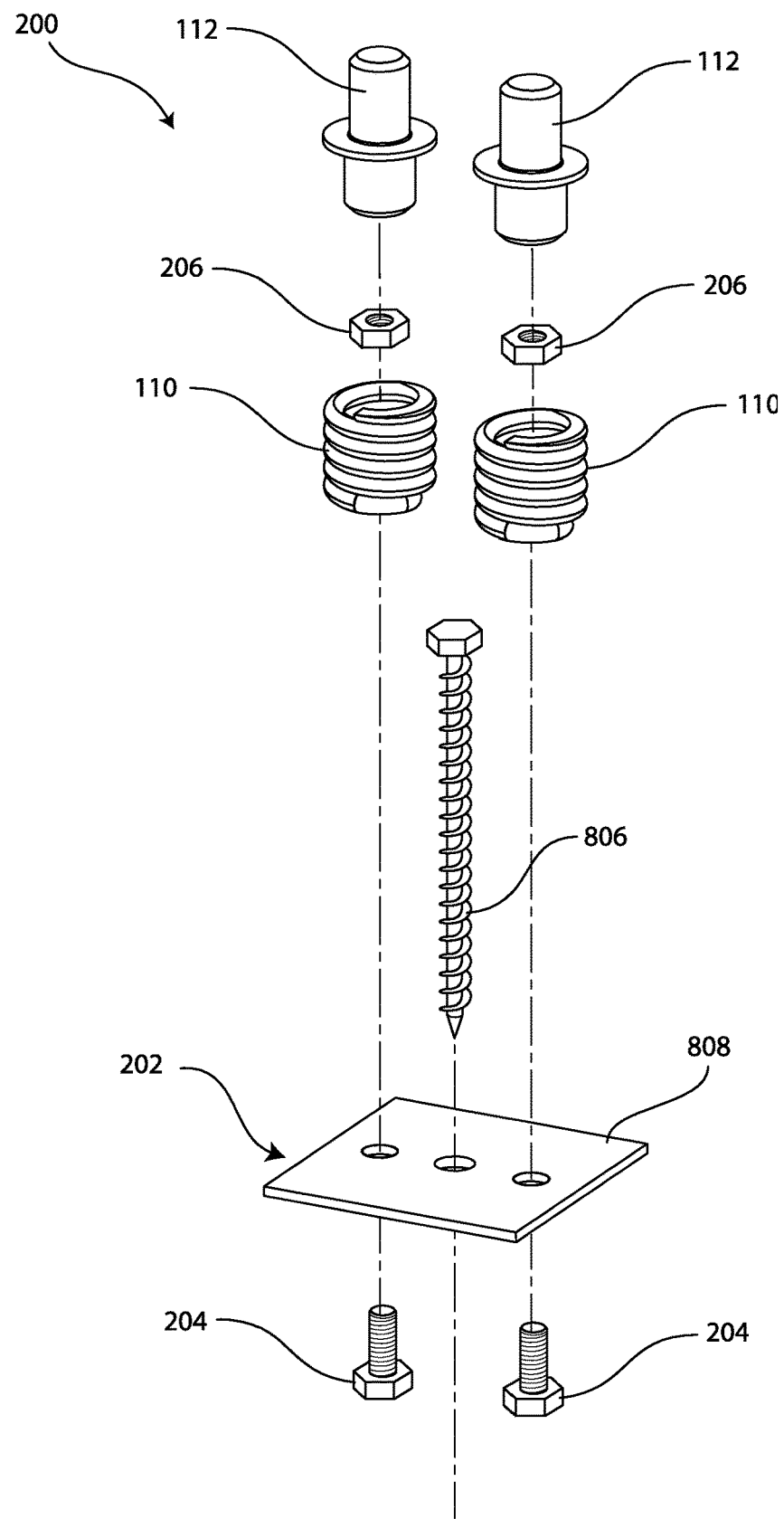

FIG. 8 presents yet another embodiment that is a variation of the first embodiment in which the function of anchor sleeve (102) is served by surface fastener such as an anchor screw (806). This alternative embodiment is more suitable for occasions where a portable fencing system is needed in a new location, or where it is not convenient or advantageous to insert the anchor sleeves (102) into the ground. While anchor screw (806) is shown as a discrete element in FIG. 8, it may also be affixed permanently to anchor plate (808). The threads of anchor screw (806) permit a convenient means for inserting into the ground using, for example, a drill motor or by hand. Alternatively, anchor screw (806) can be a smooth cylinder or tube affixed to anchor plate (808) that is simply driven into the ground using a hammer or similar method, or into a hole previously augered into the ground. As with previously described embodiments, those descriptions of the various features that are in common with this particular embodiment, so as for example spring (110) and adapter (112), are also generally applicable to this particular embodiment.

EXEMPLARY EMBODIMENTS OF THE INVENTION

A1. An anchor fixture assembly (200) comprising:
an anchor plate (108) comprising a bottom surface and an upper surface, comprising a sleeve mount cylinder (106) that extends from the bottom surface; and,
one or more springs (110) comprising a bottom portion and an upper portion, wherein the bottom portion of the spring (110) is affixed to the upper surface of the anchor plate (108) and the upper portion of the spring (110) is connected to a mounting pole (104).
A2. An anchor fixture assembly (200) comprising:
an anchor plate (108) comprising a bottom surface and an upper surface;
one or more springs (110) comprising a bottom portion and an upper portion, wherein the bottom portion of the spring (110) is affixed to the upper surface of the anchor plate (108) and the upper portion of the spring (110) is connected to a mounting pole (104); and,
wherein the bottom surface of the anchor plate (108) is flat.
A3. An anchor fixture assembly (200) comprising:
an anchor plate (108) comprising a bottom surface and an upper surface, comprising a fastener (806) that extends below the bottom surface; and,
one or more springs (110) comprising a bottom portion and an upper portion, wherein the bottom portion of the spring (110) is affixed to the upper surface of the anchor plate (108) and the upper portion of the spring (110) is connected to a mounting pole (104).
A4. The anchor fixture assembly of any of embodiments 1 to 3, wherein the spring (110) comprises an internal diameter and the mounting pole (104) comprises an external diameter and the external diameter of the mounting pole (104) is less that the internal diameter of the spring (110).
A5. The anchor fixture assembly of embodiment 4, wherein the spring (110) forms an interference fit with the mounting pole (104).
A6. The anchor fixture assembly of embodiment 5, wherein the spring (110) is affixed to the anchor plate with a fastener.
A7. The anchor fixture assembly of embodiment 6, wherein the fastener comprises a bolt (204) and nut (206).
A8. The anchor fixture assembly of any of embodiments 1 to 7, wherein the spring (110) comprises steel roundbar.
A9. The anchor fixture assembly of embodiment 8, wherein the steel roundbar comprises ASTM A500 series steel.
A10. The anchor fixture assembly (200) of any of embodiments 1 to 9, wherein the spring (110) comprises an overall length in the range 2.5 to 3.5 inches.
A11. The anchor fixture assembly of any of embodiments 1 to 9, wherein the spring (110) comprises an overall length of at least 2 inches, at least 2.5 inches, at least 3 inches or at least 3.5 inches.
A12. The anchor fixture assembly of any of embodiments 1 to 11, wherein the mounting pole (104) comprises tubing having an outer diameter in the range 1.0 inch to 1.5 inch.
A13. The anchor fixture assembly of any of embodiments 1 to 11, wherein the mounting pole (104) comprises tubing comprising a wall thickness in the range 0.05 inch to 0.125 inch.
A14. The anchor fixture assembly of any of embodiments 1 to 13, wherein the anchor plate (108) is at least 25 inches, 30 inches, 35 inches, or 40 inches in length.
A15. The anchor fixture assembly (200) of any of embodiments 1 to 13, wherein the anchor plate (108) is at least 6 inches, at least 8 inches, at least 10 inches, at least 12 inches or at least 14 inches in width.
A16. The anchor fixture assembly (200) of any of embodiments 1 to 13, wherein the anchor plate (108) is at least 0.25 inch, at least 0.3 inch, at least 0.35 inch, at least 0.4 inch, or at least 0.5 inch in thickness.
A17. The anchor fixture assembly (200) of any of embodiments 1 to 13, wherein the anchor plate (108) comprises dimensions of about of 33 inches in length, about 10 inches in width, and a thickness of about 0.375 inch.
A18. The anchor fixture assembly (200) of any of embodiments 1 to 17, wherein the anchor plate comprises steel.
A19. The anchor fixture assembly (200) of any of embodiments 1 to 18, comprising a pole adapter (112) comprising a first end and a second end, wherein the first end is connected to the upper portion of the spring (110) and the second end connected to the mounting pole (104).
A20. The anchor fixture assembly of embodiment 19, wherein the pole adapter (112) is insertably connected to the spring (110) or mounting pole (104).
B1. A portable fencing system comprising:
a plurality of anchor fixture assemblies (200) of any of embodiments 1 to 20; at least one barrier frame connected between two anchor fixture assemblies, thereby forming a barrier.
B2. The portable fencing system of embodiment B1, wherein the at least one barrier frame is at least 6 feet, at least 7 feet, at least 8 feet, or at least 9 feet in width.
B3. The portable fencing system of embodiment B1, wherein the at least one barrier frame is at least 3 feet, at least 4 feet, at least 5 feet, or at least 6 feet in height.
C1. A portable fencing system comprising: a plurality of anchor fixture assemblies (200) of any of embodiments 1 to 20; barrier netting (116) connected between two of the mounting poles, thereby forming a barrier.
D1. The portable fencing system of any of embodiments B1 to B3 or C1, wherein the anchor fixture assembly (200) comprises a sleeve mount cylinder (106) that extends from the bottom surface, further comprising an anchor sleeve (102) insertably connected to the sleeve mount cylinder (106).
E1. A method of assembling a portable fencing system comprising connecting the sleeve mount cylinder (106) to the anchor sleeve (102) of the portable fencing system of embodiment D1.
E2. The method of assembling a portable fencing system of embodiment E1, further comprising inserting the anchor sleeve (102) into the ground prior to connecting the sleeve mount cylinder to the anchor sleeve.

F1. A method of disassembling a portable fencing system comprising disconnecting the sleeve mount cylinder (106) from the anchor sleeve (102) of the portable fencing system of embodiment D1.

G1. A portable fencing system useful for forming a barrier along a portion of a perimeter of a designated area, said system comprising: an anchor fixture assembly comprising a flat anchor plate and one or more springs, wherein a bottom portion of the spring is rigidly affixed to the plate and an upper portion of the spring is adapted to receive a mounting pole; and, wherein the anchor plate is configured to lie on a ground level surface of the designated area, and provided with adequate stability for maintaining one or more mounting poles in a substantially upright orientation.

G2. The portable fencing system of embodiment G1, wherein the anchor plate and its attachments reside entirely above the ground surface and the anchor plate is configured in regard to length, width, and thickness so as to maintain the mounting pole or poles in a substantially upright orientation over an expected range of external forces.

G3. The portable fencing system of embodiment G1 or G2, wherein the anchor plate comprises a sleeve mount cylinder rigidly attached to the anchor plate that is configured for insertion into the ground, thereby substantially rigidly and removably securing the plate onto the ground level surface, thereby maintaining the mounting pole or poles in a substantially upright orientation over an expected range of external forces.

G4. The portable fencing system of any of the embodiments G1 to G3, wherein the fencing system comprises an anchor sleeve, placed substantially below the ground level surface, adapted to receive a sleeve mount cylinder portion of the anchor plate, thereby removably securing the plate onto the ground level surface.

G5. The portable fencing system of any of the embodiments G1 to G4, wherein the fencing system comprises an anchor screw configured for insertion into the ground thereby removably securing the plate to the ground surface.

G6. The portable fencing system of any of the embodiments G1 to G5, wherein the spring is configured with an internal diameter such as to allow direct insertion of the mounting pole therein.

G7. The portable fencing system of any of the embodiments G1 to G6, wherein the fencing system comprises an adapter configured at a first end to removably attach to the spring and, at a second end, to attach to the mounting pole, thereby forming a detachable structure.

G8. The portable fencing system of any of the embodiments G1 to G7, wherein the spring is configured at one end to be secured to the anchor plate with a fastener.

G9. The portable fencing system of any of the embodiments G1 to G8, wherein the fastener comprises a bolt and nut.

G10. The portable fencing system of any of the embodiments G1 to G9, wherein the spring comprises steel roundbar.

G11. The portable fencing system of any of the embodiments G1 to G10, wherein the roundbar comprises ASTM A500 series steel.

G12. The portable fencing system of any of the embodiments G1 to G11, wherein the roundbar has a diameter in the range of 0.25 to 0.50 inch.

G13. The portable fencing system of any of the embodiments G1 to G12, wherein the roundbar comprises a diameter in the range of 0.325 to 0.365 inch.

G14. The portable fencing system of any of the embodiments G1 to G13, wherein the spring has an overall length in the range 2.5 to 3.5 inches.

G15. The portable fencing system of any of the embodiments G1 to G14, wherein the spring is configured with an inner diameter so as to provide an interference fit with the outer diameter of the mounting pole.

G16. The portable fencing system of any of the embodiments G1 to G15, wherein the adapter is configured with an outer diameter at the first end so as to provide an interference fit with the inner diameter of the spring.

G17. The portable fencing system of any of the embodiments G1 to G16, wherein the adapter is configured with an outer diameter at the second end so as to provide an interference fit with the inner diameter of the mounting pole.

G18. The portable fencing system of any of the embodiments G1 to G17, wherein the mounting pole is constructed of aluminum alloy tubing having an outer diameter in the range 1.0 inch to 1.5 inch and having a wall thickness in the range 0.05 inch to 0.125 inch.

G19. The portable fencing system of any of the embodiments G1 to G18, wherein the mounting pole is constructed of a 6061 or 6063 aluminum alloy tubing.

G20. The portable fencing system of any of the embodiments G1 to G19, wherein the mounting pole outside diameter is about 1.25 inch with a wall thickness of about 0.06 inch.

G21. The portable fencing system of any of the embodiments G1 to G20, wherein the mounting pole has a length in the range 4 feet to eight feet.

G22. The portable fencing system of any of the embodiments G1 to G21, wherein the mounting pole has a length greater than 5 feet.

G23. The portable fencing system of any of the embodiments G1 to G22, wherein the anchor plate is includes an iron alloy.

G24. The portable fencing system of any of the embodiments G1 to G23, wherein the anchor plate and its attachments lie entirely above the ground surface and wherein the anchor plate has dimensions of about of 33 inches in length, 10 inches in width, and with a thickness of 0.375 inch.

G25. The portable fencing system of any of the embodiments G1 to G24, wherein the anchor plate has permanently attached thereto a sleeve mount cylinder includes nominal 1.0 inch schedule 40 steel pipe having a length in the range of 12 inches to 16 inches.

G26. The portable fencing system of any of the embodiments G1 to G25, wherein the anchor plate is secured onto the ground surface using an anchor screw inserted directly into the ground.

G27. The portable fencing system of any of the embodiments G1 to G26, wherein a plurality of anchor fixture assemblies are positioned at predetermined intervals along a portion of the perimeter of the designated area.

G28. The portable fencing system of any of the embodiments G1 to G27, wherein each anchor fixture assembly comprises one or more mounting poles.

G29. The portable fencing system of any of the embodiments G1 to G28, wherein flexible netting is affixed to at least two mounting poles, the at least two mounting poles being mounted on at least two adjacent anchor fixtures positioned along a portion of the perimeter of the designated area, thereby forming a barrier.

H1. A method comprising placing on the ground surface, two or more anchor fixtures of the portable fencing system of any of the embodiments G1 to G28 at predetermined intervals along the portion of a perimeter; and, inserting two or more mounting poles onto the two or more anchor fixtures.

H2. The method of embodiment H1 further comprising inserting the mounting poles into the springs mounted on the anchor fixture.

H3. The method of embodiment H1 or H2 comprising removably mounting the anchor fixtures onto corresponding anchor sleeves embedded in the ground.

H4. The method of any of the embodiments H1 to H3 comprising attaching flexible netting to the two or more mounting poles.

H5. The method of any of the embodiments H1 to H4 comprising removing the mounting poles from the anchor fixture, and removing the anchor fixture from the ground.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. An anchoring system for a portable fence comprising,
   a) an anchor plate having an upper surface and a lower surface,
   b) a first opening in the anchor plate extending through the upper and lower surfaces of the anchor plate,
   c) a fastener having a threaded portion and a head portion, the fastener being insertable into the first opening in the anchor plate, such that the head portion faces the lower surface of the anchor plate, and the threaded portion extends away from the upper surface of the anchor plate,
   d) a coil spring formed of coils, said coil spring having first and second opposite end portions and an end coil at the first end portion, said coil spring further including an inner spring space defined by the coils, the inner spring space having a first inside diameter from the second end portion of the coil spring up to the end coil at the first end portion of the coil spring,
   e) said coil spring being aligned with the first opening in the anchor plate such that the end coil at the first end portion of the coil spring bears against the upper surface of the anchor plate, and the second end portion of the coil spring extends a first predetermined distance from the upper surface of the anchor plate,
   f) the threaded portion of said fastener being received in the inner spring space of said coil spring and extending a second predetermined distance from the upper surface of the anchor plate, and said second predetermined distance being less than said first predetermined distance,
   g) a nut member being sized to fit with clearance within the first inside diameter of the inner spring space to enable said nut member to be threaded onto the threaded portion of the fastener in the inner spring space,
   h) the end coil at the first end of said coil spring being formed to interfere with said nut member when the nut member is threaded on the threaded portion of the fastener toward the end coil such that said nut member is cooperable with the end coil to lock the end coil and the anchor plate together, thereby locking the coil spring to the anchor plate,
   i) said anchoring system further comprising a mounting pole adapter having an annular collar with upper and lower annular surfaces, a first cylindrical stem portion extending from the upper annular surface of said annular collar, and a second cylindrical stem portion extending below the lower annular surface of said annular collar, the second cylindrical stem portion of said mounting pole adapter being removably insertable in the inner spring space such that the annular collar bears against the second end portion of the coil spring, and the second cylindrical stem portion extends toward the end coil at the first end of the coil spring, and the first cylindrical stem portion projects away from the second end portion of the coil spring for removable insertion in a complementary shaped portion of a section of portable fence, whereby a section of portable fence is removably supportable on the coil spring of the anchoring system.

2. The anchoring system as claimed in claim 1, wherein the end coil at the first end portion of the coil spring has a reduced inside diameter smaller than the first inside diameter of the coil spring and smaller than the nut member to enable said nut member, when threaded onto the threaded stem portion of the fastener, to be threaded against the first end portion of the coil spring to lock the end coil at the first end portion of the coil spring against the upper surface of the anchor plate member.

3. The anchoring system as claimed in claim 2, wherein the end coil at the first end of the coil spring is partially closed to enable said nut member, when threaded onto the threaded stem portion of the fastener, to be threaded against the first end portion of the coil spring to lock the end coil against the upper surface of the anchor plate member, and thereby fasten the coil spring to the anchor plate.

4. The anchoring system as claimed in claim 1, wherein the second cylindrical stem portion of the mounting pole adapter has an outside diameter sized to provide a predetermined interference fit in the first inside diameter of the coil spring, whereby the mounting pole adapter is removably insertable into the inner spring space.

5. The anchoring system as claimed in claim 1, wherein said anchor plate includes two of said openings spaced a predetermined distance apart, two of said coil springs, two of said fasteners, two of said nuts, and two of said mounting pole adapters, each of said openings accommodating one of said fasteners, and each of said openings being aligned with one of said coil springs, the end coil at the first end portion of each of said coil springs being locked to said anchor plate by respective said fasteners and respective said nuts, and each of said coil springs accommodating a respective said mounting pole adapter to enable each of said mounting pole adapters to support a separate section of portable fence, whereby respective separate sections of portable fence are supportable on the anchor plate of the anchoring system.

6. The anchoring system as claimed in claim 5, wherein said mounting pole adapters are spaced a predetermined distance from each other to permit adjacent positioning of respective separate sections of portable fence.

7. The anchoring system as claimed in claim 5, further including a portable fence section having a hollow mounting pole for receiving the first cylindrical stem portion of the mounting pole adapter in a snug fitting relationship to permit removable assembly of the mounting pole adapter and the first cylindrical stem portion and disassembly thereof and wherein the hollow mounting pole of one of said portable fence sections is supported on one of said first cylindrical stem portions and a second said portable fence sections is supported on a second of said first cylindrical stem portions.

8. The anchoring system as claimed in claim 1, wherein the second cylindrical stem portion of the mounting pole adapter is sized to fit into the inner space of the coil spring in a predetermined press-fit relationship, whereby the mounting pole adapter is removably insertable into the inner spring space.

9. The anchoring system as claimed in claim 1, wherein the anchor plate is rectangular.

10. The anchoring system as claimed in claim 1, wherein the first and second cylindrical stem portions of the mounting pole adapter have different outside diameters.

11. The anchoring system as claimed in claim 1, wherein the anchor plate is provided with a mounting cylinder extending a predetermined distance from the lower surface of the anchor plate.

12. The anchoring system as claimed in claim 11, wherein a hollow anchor sleeve, unconnected to the mounting cylinder, is positionable in a ground position to receive the mounting cylinder such that the reception of the mounting cylinder in the anchor sleeve holds the anchor plate in a fixed position when the anchor sleeve is in a fixed ground position.

13. The anchoring system as claimed in claim 11, wherein an anchor sleeve and the mounting cylinder are sized to permit removable insertion of the mounting cylinder in the anchor sleeve.

14. The anchoring system as claimed in claim 1, wherein the anchor plate is provided with a second opening and a fastener member is receivable in said second opening at the upper surface of the anchor plate to fasten said anchor plate in a fixed position onto a support surface for the anchoring system.

15. The anchoring system as claimed in claim 14, wherein the fastener member is a threaded screw for threading into the support surface for the anchoring system.

16. The anchoring system as claimed in claim 1, wherein the coil spring has a vertical orientation with respect to the upper surface of said anchor plate when said anchor plate is in a horizontal orientation, said spring coil is resiliently deflectable from said vertical orientation in a direction toward the upper surface of said mounting plate when the mounting pole adapter supports a section of portable fence and a predetermined force is imposed on a section of portable fence in a direction that is parallel to the upper surface of said mounting plate.

17. The anchoring system as claimed in claim 1, wherein the second cylindrical stem portion of the mounting pole adapter and the first inside diameter of the coil spring are sized to provide a snug fit therebetween, to enable the mounting pole adapter to be removably inserted into the inner spring space.

18. The anchoring system as claimed in claim 1, further including a portable fence section having a hollow mounting pole for receiving the first cylindrical stem portion of the mounting pole adapter in a snug fitting relationship to permit removable assembly of the mounting pole adapter onto the first cylindrical stem portion and disassembly of the mounting pole adapter from the first cylindrical stem portion.

19. The anchoring system as claimed in claim 18, wherein said portable fence section has opposite ends and has one of said hollow mounting poles at each end such that each said portable fence section is supported by one of said cylindrical stem portions at each said end of said portable fence section.

20. An anchoring system for a portable fence comprising,
a) an anchor plate having an upper surface and a lower surface,
b) a pair of spaced openings in the anchor plate extending through the upper and lower surfaces of the anchor plate,
c) a pair of fasteners having a threaded portion and a head portion, each said fastener being insertable one of the openings in the anchor plate, such that the head portion of each said fastener faces the lower surface of the anchor plate, and the threaded portion of each said fastener extends away from the upper surface of the anchor plate,
d) a pair of coil springs formed of coils, each said coil spring having first and second opposite end portions and an end coil at the first end portion, each said coil spring further including an inner spring space defined by the coils, the inner spring space of each said coil spring having a first inside diameter from the second end portion of each said coil spring up to the end coil at the first end portion of each said coil spring,
e) each said coil spring being aligned with one of the openings in the anchor plate such that the end coil at the first end portion of each said coil spring bears against the upper surface of the anchor plate, and the second end portion of each said coil spring extends a first predetermined distance from the upper surface of the anchor plate,
f) pair of nut members, each said nut member being sized to fit with clearance within the first inside diameter of the inner spring space of one of said coil springs to enable each said nut member to be threaded onto the threaded portion of one of the fasteners in the inner spring space of one of said coil springs,
g) the end coil at the first end of each said coil spring having a smaller diameter than the first inside diameter of each said coil spring such that the end coil of each said coil spring interferes with a respective one of said nut members when the respective nut members are threaded on the threaded portion of respective said fasteners toward the end coil at the first end portion of respective said coil springs to permit the respective said nut members to lock the end coil at the first end portion of each said coil spring and the anchor plate together, thereby locking the respective said coil springs to the anchor plate,
h) said anchoring system further comprising a pair of mounting pole adapters, each said mounting pole adapter having an annular collar with upper and lower annular surfaces, a first cylindrical stem portion extending from the upper annular surface of said annular collar, and a second cylindrical stem portion extending below the lower annular surface of said annular collar, the second cylindrical stem portion of each said mounting pole adapter being removably insertable in a respective one of said inner spring spaces of a respective one of said coil springs such that each of the annular collars bears against the second end portion of a respective one of said coil springs, and the second cylindrical stem portion of each said mounting pole adapter extends toward the end coil at the first end portion of a respective one of said coil springs, and the first cylindrical stem portion projects away from the second end portion of a respective one of said coil springs for removable insertion in a complementary shaped portion of a separate section of portable fence, whereby respective separate sections of portable fence are removably supportable on each of the coil springs of the anchoring system.

21. An anchoring system for a portable fence comprising,
a) an anchor plate having an upper surface and a lower surface,
b) a first opening in the anchor plate extending through the upper and lower surfaces of the anchor plate,
c) a fastener having a threaded portion and a head portion, the fastener being insertable into the first opening in the anchor plate, such that the head portion faces the lower surface of the anchor plate, and the threaded portion extends away from the upper surface of the anchor plate,
d) a coil spring formed of coils, said coil spring having first and second opposite end portions and an end coil at the first end portion, said coil spring further including an inner spring space defined by the coils, the inner spring space having a first inside diameter from the second end portion of the coil spring up to the end coil at the first end portion of the coil spring,
e) said coil spring being aligned with the first opening in the anchor plate such that the end coil at the first end portion of the coil spring bears against the upper surface of the anchor plate, and the second end portion of the coil spring extends a first predetermined distance from the upper surface of the anchor plate,
f) the threaded portion of said fastener being received in the inner spring space of said coil spring and extending a second predetermined distance from the upper surface of the anchor plate, and said second predetermined distance being less than said first predetermined distance,
g) a nut member being sized to fit with clearance within the first inside diameter of the inner spring space to enable said nut member to be threaded onto the threaded portion of the fastener in the inner spring space,
h) the end coil at the first end of said coil spring being formed to interfere with said nut member when the nut member is threaded on the threaded portion of the fastener toward the end coil such that said nut member is cooperable with the end coil to lock the end coil and the anchor plate together, thereby locking the coil spring to the anchor plate,
i) said anchoring system further comprising a mounting pole adapter having an annular collar with upper and lower annular surfaces, a first cylindrical stem portion extending from the upper annular surface of said annular collar, and a second cylindrical stem portion extending below the lower annular surface of said annular collar, such that the mounting pole adapter is a unified one piece component, the second cylindrical stem portion of said mounting pole adapter is removably insertable in the inner spring space such that the annular collar bears against the second end portion of the coil spring, and the second cylindrical stem portion extends toward the end coil at the first end of the coil spring, and the first cylindrical stem portion projects away from the second end portion of the coil spring for removable insertion in a complementary shaped portion of a section of portable fence, whereby a section of portable fence is removably supportable on the coil spring of the anchoring system.

* * * * *